United States Patent
Edara et al.

(10) Patent No.: US 6,816,938 B2
(45) Date of Patent: Nov. 9, 2004

(54) METHOD AND APPARATUS FOR PROVIDING A MODULAR SYSTEM ON-CHIP INTERFACE

(75) Inventors: Sagar Edara, San Jose, CA (US); Amjad Qureshi, Fremont, CA (US); Ajit Deora, Fremont, CA (US); Ramana Kalapatapu, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 548 days.

(21) Appl. No.: 09/818,429

(22) Filed: Mar. 27, 2001

(65) Prior Publication Data

US 2002/0144045 A1 Oct. 3, 2002

(51) Int. Cl.$^7$ .............................................. G06F 13/14
(52) U.S. Cl. ........................ 710/305; 710/306; 710/311; 710/312; 710/315
(58) Field of Search .................................. 710/100, 107, 710/116, 305, 306, 311, 312, 313, 314, 315

(56) References Cited

U.S. PATENT DOCUMENTS

| | | | | |
|---|---|---|---|---|
| 5,678,009 A | * | 10/1997 | Bains et al. ................. | 710/125 |
| 6,122,690 A | * | 9/2000 | Nannetti et al. ............ | 710/311 |
| 6,353,867 B1 | * | 3/2002 | Qureshi et al. ............. | 710/305 |
| 6,378,019 B1 | * | 4/2002 | Dalhuijsen ................... | 710/305 |
| 2002/0161959 A1 | * | 10/2002 | Apostol et al. ............. | 710/305 |

* cited by examiner

Primary Examiner—Khanh Dang
(74) Attorney, Agent, or Firm—Bever, Hoffman & Harms, LLP; Patrick T. Bever

(57) ABSTRACT

A system on-chip interface device includes a plurality of cores comprising core systems a plurality of standard interfaces interfaced to the plurality of cores a system bus, an on-chip bus, a plurality of system interface blocks comprising first and second interfaces, wherein the first interface comprises a standard interface interfaced to at least one core system and the second interface comprises an interface interfaced to the system bus, a system bus bridge comprising first and second system bus interfaces wherein the first system bus interface comprises an interface interfaced to the system bus and the second system bus interface comprises a standard interface, an on-chip bus bridge comprising first and second on-chip bus interfaces wherein the first on-chip bus interface comprises a standard interface interfaced to the system bus bridge and the second on-chip bus interface comprises an interface interfaced to the on-chip bus.

20 Claims, 3 Drawing Sheets

METHOD AND APPARATUS FOR PROVIDING A MODULAR SYSTEM ON-CHIP INTERFACE

BACKGROUND OF THE INVENTION

1. Field of the Invention

The present invention relates generally to the field of systems on-chip, and specifically to a method and apparatus for providing a modular system on-chip device.

2. Background Information

A system on-chip device may include a core unit, designed by a first vendor, to interface to a number of different, and possibly proprietary, bus architectures. In this type of system, the core unit must include a specific logic circuit to interface to each bus architecture. Thus, each time a core unit of a first vendor is implemented in a system having a bus architecture of a second vendor, the core unit must implement the appropriate interface logic. This, however, is an inefficient solution for vendors because a core system has to be modified each time it has to interface to a different bus architecture. The present invention solves this problem by providing a modular on-chip interface device.

The present invention is illustrated by way of example and not limitation in the figures of the accompanying drawings in which like references indicate similar elements and in which:

DETAILED DESCRIPTION

Figure 1:
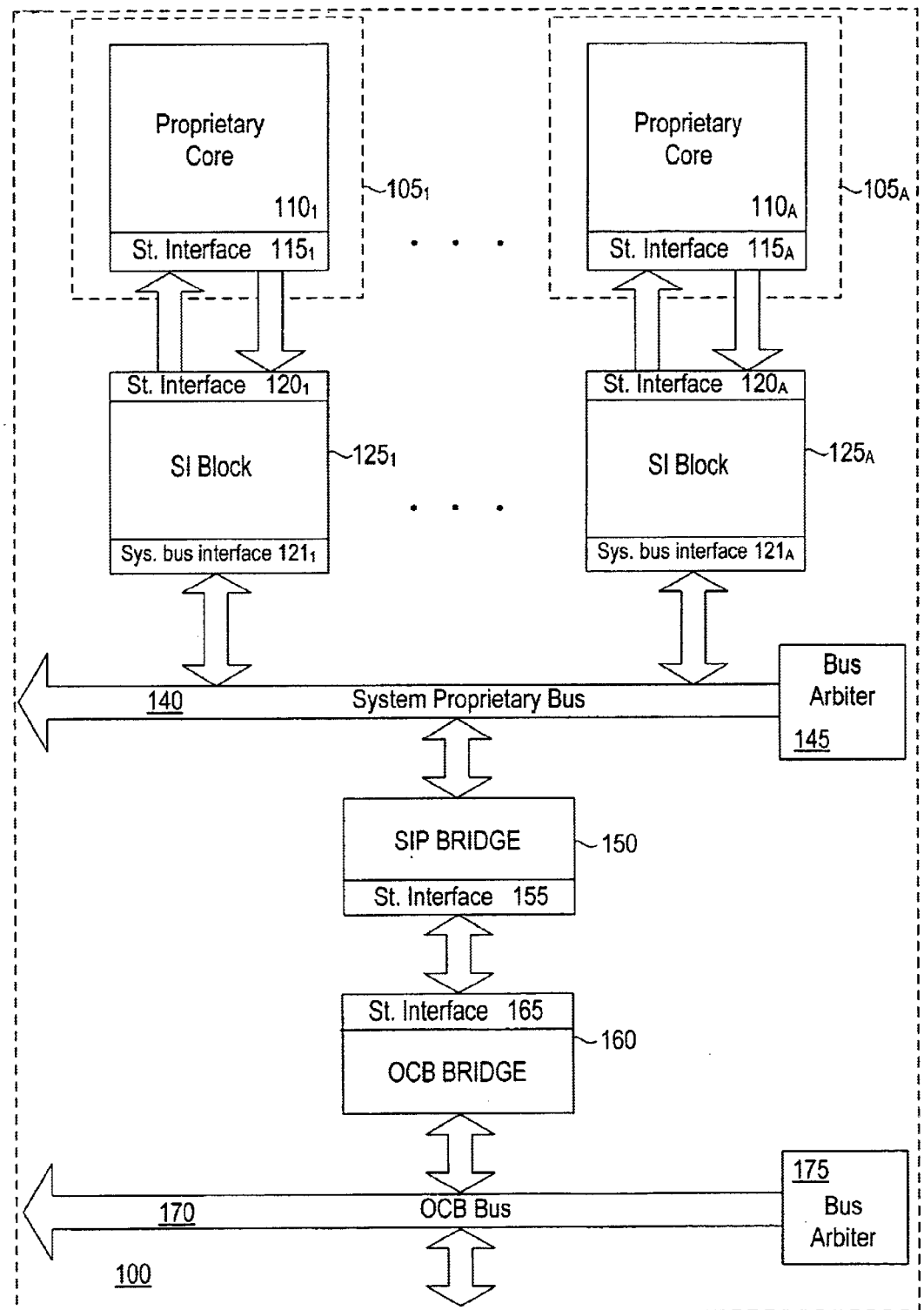
FIG. 1 illustrates a block diagram of a system on-chip (SoC) device, according to an example of the present invention.

FIG. 1 illustrates a block diagram of a system on-chip (SoC) device 100, according to the present invention. Referring to FIG. 1, the SoC device 100 includes one or more cores $105_1$–$105_A$, where "A" is a positive whole number, having respective core systems $110_1$–$110_A$ (110) and standard interfaces $115_1$–$115_A$. The core systems may be any type of systems including proprietary (IP) systems. For example, the core systems $110_1$–$110_A$ may include a central processing unit (e.g., microprocessor, microcontroller, digital signal processor, reduced instruction set computer processor, etc.), memory (e.g., random access memory, read only memory, etc.), peripheral devices (e.g., network card, serial bus and interface, input/output devices, etc.), direct memory access, and combinations thereof.

In addition, the SoC device 100 includes system interface ("SI") blocks $125_1$–$125_A$ each having first and second interfaces. The first interfaces of SI blocks $125_1$–$125_A$ include standard interfaces $120_1$–$120_A$ which interface to standard interfaces $115_1$–$115_A$ of cores $120_1$–$105_A$. For example, one standard interface is a VC interface such as the On-Chip Bus Virtual Component Interface Standard (Version 1.0 (OCB VCI 2 1.0) promulgated by the Virtual Socket Interface Alliance (VSIA).

The second interfaces of SI blocks $125_1$–$125_A$ interface to a system bus 140. The system 140 includes a bus arbiter 145 which provides arbitration among devices on the system bus 140. The SI blocks $125_1$–$125_A$ allow the core systems $110_1$–$110_A$, which may be proprietary systems, to communicate with the system bus 140 over a standard interface. That is, the core systems $110_1$–$110_A$, which may comprise a number of different architectures and protocols, can communicate with a single bus (i.e., system bus 140) by interfacing to a standard interface. The system bus 140 may be of any type including, but not limited or restricted to, a peripheral component interconnect (PCI) bus, a proprietary bus such as, for example, an SIP bus developed by Phoenix Technologies, Ltd., of San Jose, Calif., (now known as InSilicon Corporation, and the like.

The system bus 140 is coupled to a first interface of a system bus bridge 150. The system bus bridge 150 includes a second interface which is a standard interface 155 and is coupled to an on-chip bus ("OCB") bridge 160. The OCB bridge 160 also includes a standard interface 165 for interfacing to the system bus bridge 150 by way of the standard interface 155. The OCB bridge 160 is in turn coupled to an on-chip bus 170. The system bus bridge 150 and OCB bridge 160 provide a master/slave interface between the system bus 140 and the OCB 170. The OCB 170 may be of any bus architecture including, but not limited or restricted to, a PCI bus, an ARM advanced microcontroller bus architecture ("AMBA"), etc.

By providing system bus bridge 150 and OCB bridge 160, the present invention allows vendors, using their own proprietary on-chip bus 170, to communicate to core systems $110_1$–$110_A$ by way of the system bus 140, by simply interfacing to a standard interface. This simplifies the design and provides a modular approach for vendors. That is, vendors can communicate with processing elements within the device 100 (e.g., core system 110) by simply interfacing to the standard interface, without the need to interface to the core system directly, to give a standard plug and play effect. In one example, the standard interface is a VC interface such as the On-Chip Bus Virtual Component Interface Standard (Version 1.0 (OCB VCI 2 1.0) is the most recent version available) promulgated by the Virtual Socket Interface Alliance (VSIA). Of course, other standard interfaces could be used.

Figure 2:
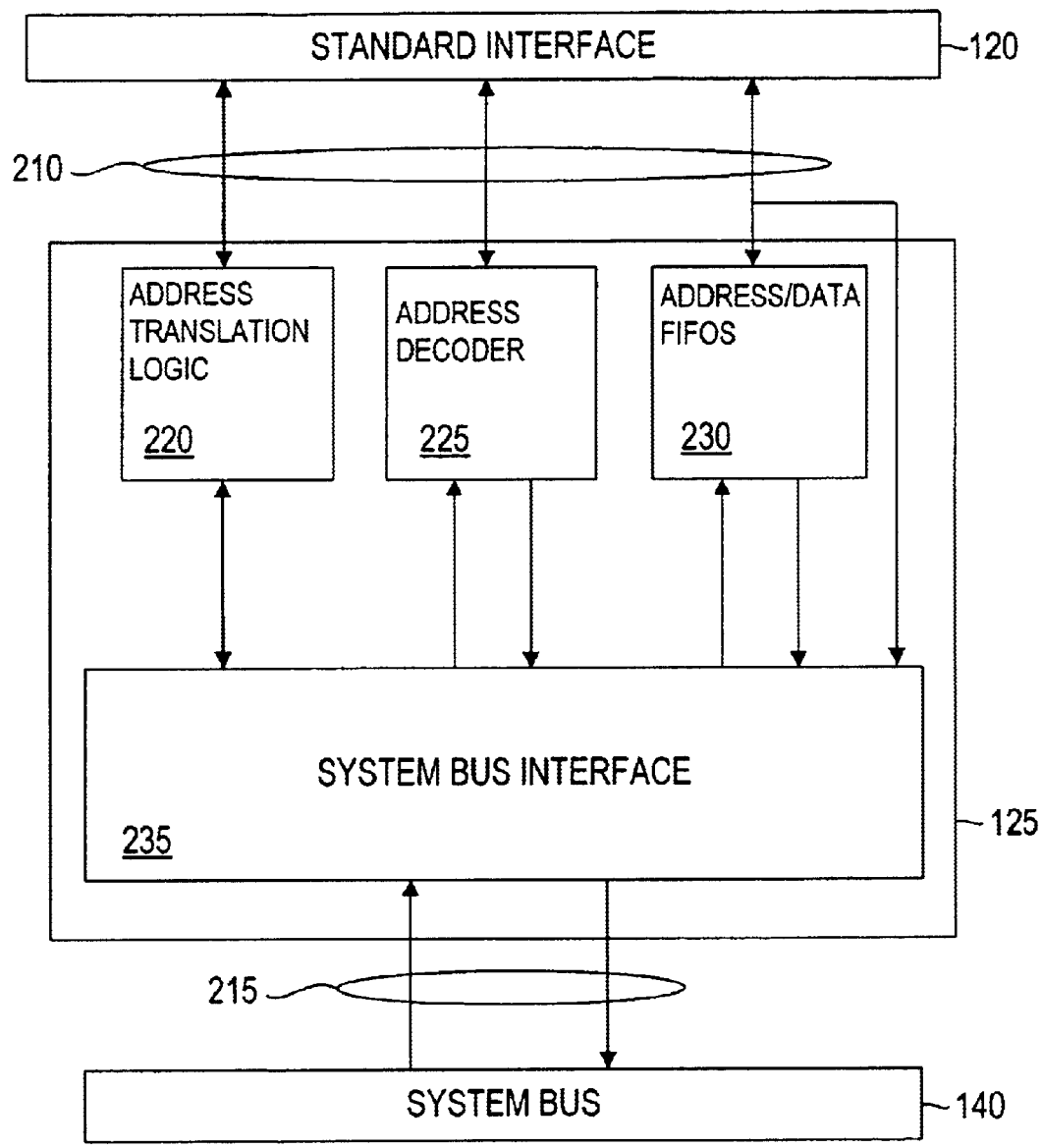
FIG. 2 illustrates a block diagram of the system interface (SI) block, according to an example of the present invention.

FIG. 2 illustrates a block diagram of the SI block 125, according to one embodiment of the present invention. Referring to FIG. 2, the SI block 125 includes signal lines 210 which interface to the standard interface 120, and signal lines 215 for interfacing to the system bus 140. The SI block 125 includes an address translation logic 220, an address decoder 225, and address/data first-in, first-out devices ("FIFOs") 230. The address translation logic 220 performs address conversion, translating a first address on a first bus to a second address on a second bus, and vice versa. The address decoder 225 determines whether an incoming address on the first bus is targeted to a device on the second bus. The address decoder 225 includes one or more registers which contain valid address ranges of the first and second buses. If an incoming address on the first bus falls within the address range, the SI block 125 generates the necessary signals for initiating a transaction on the second bus, otherwise, the SI block 125 ignores the address. The address/data FIFOs 230 include a plurality of FIFOs which provide temporary buffering of address and data in both directions.

The SI block 125 further includes a system bus interface block 235 which interfaces with the system bus 140. For example, if the system bus 140 is a proprietary bus, the SI block 235 will generate and receive signals according to the proprietary bus specifications. In particular, the system bus interface block 235 is responsible for monitoring requests on the system bus targeted to the SI block 235, for initiating and completing accesses to the system bus 140, and generating and/or passing through all control signals of the system bus 140. In one embodiment, the SI block 235 interfaces with the bus arbiter 145 via request and grant lines.

The system bus bridge 150 is substantially similar to the SI block 125. That is, the system bus bridge 150 includes the address translation logic 220, address decoder 225, and system bus interface 235 as shown in FIG. 2. The system bus bridge 150 may or may not include the address/data FIFOs 230 of FIG. 2 depending on a number of factors. For example, if the on-chip bus 170 is faster than the system bus 140, then FIFOs from the system bus 140 the on-chip bus 170 are not needed since a device on the on-chip bus can drain data faster than a device on the system bus 140 can source data.

Figure 3:
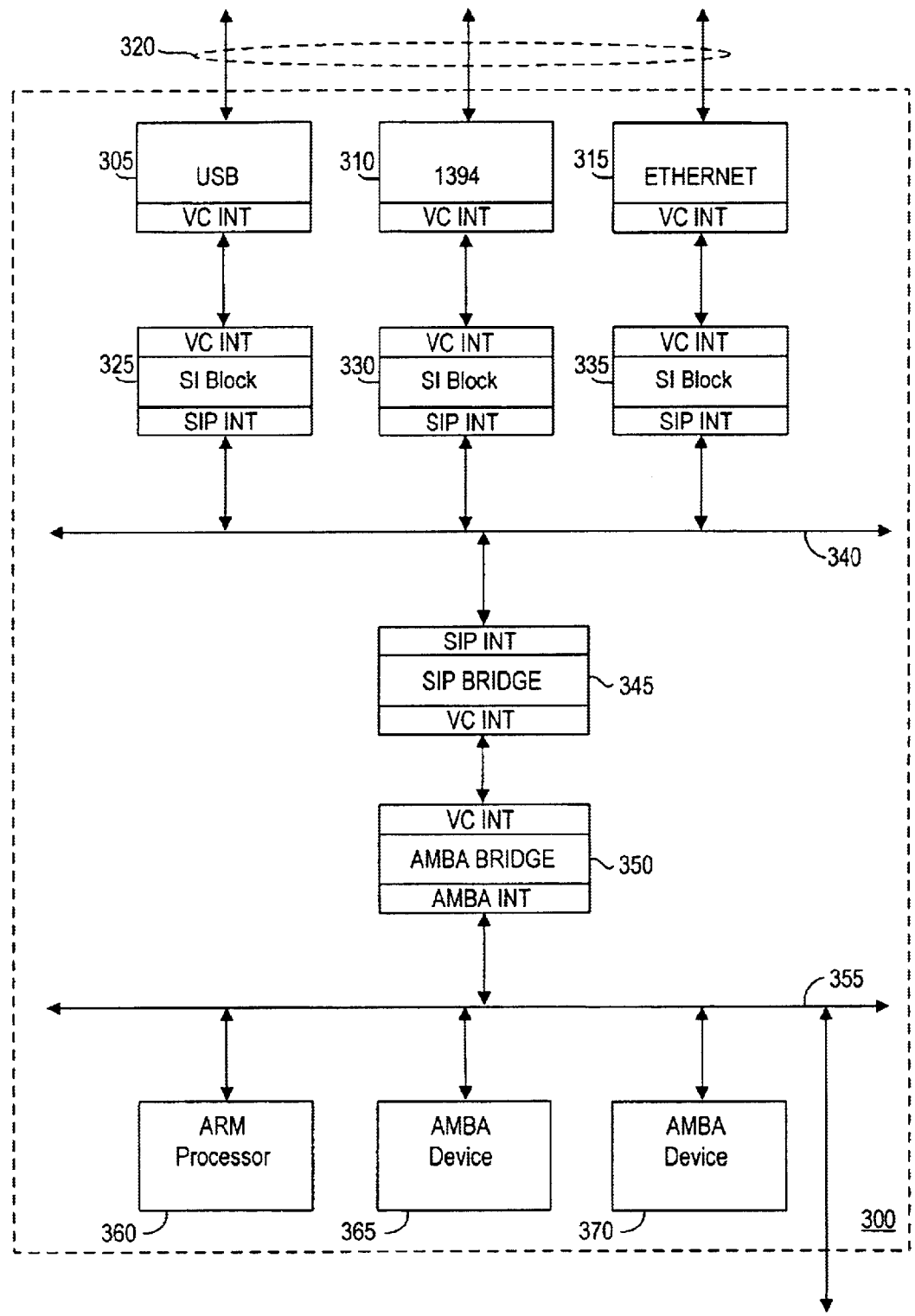
FIG. 3 illustrates a block diagram of a system on-chip device, according to an example of the present invention.

FIG. 3 illustrates a block diagram of a system on-chip device 300, according to another embodiment of the present invention. Referring to FIG. 3, the device 300 includes a universal serial bus ("USB") core system 305, a 1394 serial bus core system 310, and an Ethernet core system 315, all of which include input/output ("I/O") ports, designated by numeral 320, for access off-chip. Core systems 305, 310, and 315 are coupled to a proprietary bus 340 through respective SI blocks 325, 330, and 335. In this embodiment, the proprietary bus 340 is a system IP ("SIP") bus, owned by the assignee of the present invention. Each of the core systems 305, 310, and 315 include a VC interface which interfaces to the VC interface of the respective SI blocks 325, 330, and 335. Each of the SI blocks includes logic which interfaces with the SIP bus 340. This allows, the core systems 305, 310, and 315, which may be manufactured by three separate entities, to interface to the VC interface, without consideration for the type of proprietary bus 340 used.

The SIP bus 340 is coupled to a SIP bridge 345 which has a first SIP interface. The SIP bridge 345 has a second VC interface that is coupled to a first VC interface of an AMBA bridge 350. In turn, the AMBA bridge 350 includes a second, AMBA interface which interfaces to an AMBA bus 355. An ARM processor 360 and a number of AMBA devices 365 and 370 are coupled to the AMBA bus 355. The AMBA bus 355 also has access external to the device 300 for coupling to external AMBA devices 355. This implementation further allows a vendor, having its own bus architecture (e.g., AMBA bus architecture) to interface to the SIP bus 340, and thus the core systems 305, 310, and 315 by simply providing a bridge that interfaces between the AMBA bus 355 and the VC interface. The vendor only needs to know the address map of the core systems 305, 310, and 315 in order to interface to the same.

Embodiments of the present invention offer a unique interface which allows any vendor, customer, etc. to use their own proprietary bus to interface to the core systems by simply designing a bridge that interfaces between their proprietary bus and the standard interface (e.g., VC interface). The advantages include simpler design efforts, plug-and-play capability, fully integrated system environment on a chip, while maintaining system on-chip performance and bandwidth.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

We claim:

1. A system on-chip interface device, comprising:
a plurality of cores;
a plurality of first standard interfaces, each first standard interface being interfaced to an associated core of the plurality of cores;
a system bus;
an on-chip bus;
a plurality of system interface blocks, each system interface block comprising first and second interfaces, wherein the first interface of each system interface block comprises a second standard interface interfaced to at least one core via an associated one of said first standard interfaces, and wherein the second interface of said each system interface block is interfaced to the system bus;
a system bus bridge comprising first and second system bus interfaces wherein the first system bus interface is interfaced to the system bus and the second system bus interface comprises a third standard interface; and
an on-chip bus bridge comprising first and second on-chip bus interfaces, wherein the first on-chip bus interface comprises a fourth standard interface interfaced to the third standard interface, and wherein the second on-chip bus interface is interfaced to the on-chip bus via the second system bus interface.

2. The system on-chip interface device of claim 1 wherein the system bus bridge and the on-chip bus bridge comprise a master/slave interface between the system bus and the on-chip bus.

3. The system on-chip interface device of claim 1 wherein at least one of the system interface blocks comprises an address translation logic block.

4. The system on-chip interface device of claim 1 wherein at least one of the system interface blocks comprises an address decoder.

5. The system on-chip interface device of claim 1 wherein at least one of the system interface blocks comprises an address/data first-in-first-out device.

6. The system on-chip interface device of claim 1 wherein at least one of the system interface blocks comprises an address translation logic block, an address decoder and an address/data first-in-first-out device.

7. The system on-chip interface device of claim 1 wherein the system bus comprises a peripheral component interconnect (PCI) bus.

8. The system on-chip interface device of claim 1 wherein the system bus comprises a (SIP) bus.

9. The system on-chip interface device of claim 1 wherein the on-chip bus comprises a peripheral component interconnect (PCI) bus architecture.

10. The system on-chip interface device of claim 1 wherein the on-chip bus comprises an advanced microcontroller bus architecture.

11. The system on-chip interface device of claim 1 wherein at least one of the core systems comprises one or more of: a processor, a memory device, a peripheral device, and a direct memory access device.

12. The system on-chip interface device of claim 1 wherein at least one of the cores comprises a proprietary system.

13. The system on-chip interface device of claim 1 wherein the system bus comprises a proprietary bus architecture system.

14. A system on-chip interface device comprising:
a plurality of cores, each core comprising a first standard interface;

a system bus;

a plurality of system interface blocks, each system interface block comprising first and second interfaces, wherein the first interface of each system interface block comprises a second standard interface interfaced to an associated one of said first standard interfaces, and wherein the second interface of said each system interface block is interfaced to the system bus;

an on-chip bus;

a system bus bridge comprising first and second system bus interfaces wherein the first system bus interface is interfaced to the system bus and the second system bus interface comprises a third standard interface; and an on-chip bus bridge comprising first and second on-chip bus interfaces, wherein the first on-chip bus interface comprises a fourth standard interface interfaced to the third standard interface, and wherein the second on-chip bus interface is interfaced to the on-chip bus via the second system bus interface.

15. A method of providing a system on-chip interface between at least one core that is coupled to a system bus and an on-chip bus, the method comprising:

interfacing said at least one core to a system interface block via at least one standard interface;

interfacing the system interface block to the system bus via at least one system bus interface;

interfacing the system bus to a system bus bridge;

interfacing the system bus bridge to an on-chip bus bridge via at least one standard interface; and interfacing the on-chip bus bridge to the on-chip bus.

16. A method of providing a system on-chip interface according to claim 15 wherein the system bus bridge and the on-chip bus bridge comprise a master/slave interface between the system bus and the on-chip bus.

17. A method of providing a system on-chip interface according to claim 15 wherein at least one of the system interface blocks comprises an address translation logic block.

18. A method of providing a system on-chip interface according to claim 15 wherein at least one of the system interface blocks further comprises an address decoder.

19. A method of providing a system on-chip interface according to claim 15 wherein at least one of the system interface blocks comprises an address/data first-in-first-out device.

20. A method of providing a system on-chip interface according to claim 15 wherein at least one of the system interface blocks comprises an address translation logic block, an address decoder and an address/data first-in-first-out device.

* * * * *